Figure 1:
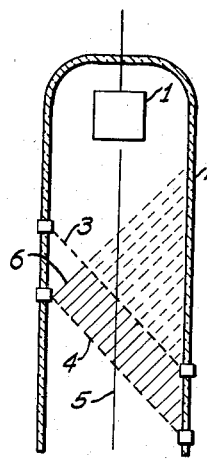

Aug. 6, 1940.                A. SIEMENS                2,210,689
                METAL VAPOR OR NOBLE GAS RECTIFIER
                        Filed April 6, 1938

WITNESSES:
Leon M. Garman
R.W. Bailey

INVENTOR
Alfred Siemens.
BY F.W.Lyle.
ATTORNEY

Patented Aug. 6, 1940

2,210,689

UNITED STATES PATENT OFFICE 2,210,689

METAL VAPOR OR NOBLE GAS RECTIFIER

Alfred Siemens, Berlin-Charlottenburg, Germany, assignor to Siemens-Schuckertwerke Aktiengesellschaft, Berlin-Siemensstadt, Germany, a corporation of Germany Application April 6, 1938, Serial No. 200,384
In Germany April 30, 1937

5 Claims. (Cl. 250—27.5)

The invention relates to metal vapor and noble gas rectifiers, particularly mercury vapor rectifiers for high potential.

In metal vapor rectifiers with vessels of glass or metal, particularly in controllable and non-controllable mercury vapor rectifiers which carry a high potential, difficulties arise because charge carriers receive a large amount of kinetic energy during the blocking intervals and start substantial discharges by impact ionization and in impinging violently on the anode surfaces, produce strong local heating which may lead to the formation of faulty cathode spots. In each case, the result is a failure of the blocking effect and with it the possibility of backfire, all of which renders the operating certainty of the rectifier plants disadvantageous.

An attempt has already been made to subdivide the discharge from the anode to the cathode into individual paths by building in of cross and blocking surfaces in the protective tube around the anode, or in the arc path; the division has indeed been in short paths of such extent that the charge carrier in the blocking phase can only pass through these portional paths in a straight line, the purpose being to prevent the charge carriers from becoming very highly accelerated.

This arrangement, however, has the disadvantage that the ignition of the discharge was rendered considerably more difficult and the potential necessary for ignition was raised very much in value. Aside from this, the cross section of the discharge path is crowded in an undesired manner by the built-in elements. For this reason, the built-in elements were not applicable for rectifiers with relatively high loading.

The arc paths, which were divided up by the building in of grids in the form of Faraday cages or of box grids or the like alternately in a field free space and in a strong field space have, on the other hand, manifested more satisfactory properties. The field spaces are so dimensioned in the direction of the arc path that the distances of the grid perpendicular to the arc direction are smaller than the mean free path of the charge carriers. The field free space on the other hand extends over a multiple of the mean free path of the charge carriers. The charge carriers are at any time strongly accelerated in the spaces of large field strength, but because of the short path which is available for them in these spaces, they cannot produce any impact ionization. For this reason, they move with constant speed when they come to the field free path. If also, a relatively large fraction of the charge carriers are gathered up in their path through the field free space by the grids, then the condition cannot be avoided that individual charge carriers penetrate to the region of the anode and here lead to the above-mentioned disturbances of the discharge process.

According to the present invention, these disadvantages are also avoided if means is provided which so influences the field lines which the charge carriers follow in the blocking periods that the charge carriers are deflected from the direction of the main electrode and cannot impinge on the main electrode. For this purpose, electric or magnetic fields may be added to the discharge paths which deflect the field lines to wall parts located in the neighborhood of the discharge paths, for example, to the protective tubes about the anode, the grid bodies or the like. Also, bodies having different potentials may be provided in the discharge paths which are so arranged that the field lines between each two neighboring bodies extend at an angle to the discharge path and are not directed to a main electrode. For this purpose, at least two grids arranged parallel to each other, the grid surfaces of which are at an angle to the discharge path, may be used. Between these grids, the field lines then extend in the above-described manner. The grids may also be constructed conically and may point with their apices to that electrode from which the charge carriers should be kept away in the blocking intervals. The grids may form the end surfaces of Faraday cages. The spaces between the grids arranged across the discharge path, particularly in the outer part of the grid bodies, are preferably blocked by cross walls in the radial direction. The cross walls are preferably arranged on one of the grid bodies and engage a groove trough in the neighboring grid body without contacting this neighboring grid body. In discharge tubes with anode protective tubes, an anode protective tube may have plates or attachments projecting inwardly which penetrate in the intermediate spaces between the sets of neighboring grids and thus lock the space between the Faraday cages and the anode tube. The distances between the neighboring grids are preferably so small that impact ionization is excluded in the field guiding spaces. The grid or the Faraday cages provided with grids may be individually controllable.

In the drawing, several exemplary embodiments are illustrated:

Figure 1 shows a longitudinal section through an anode protective tube. The Figures 2 to 5 show other modifications.

According to Fig. 1, the anode is identified by the numeral 1 and the anode protective tube by 2. In the anode protective tube, there are grids 3 and 4 which are immediately adjacent to each other. The grids lie, as can be seen from the drawing, across the discharge path. The grids 3 and 4 are either fastened by insulation in the anode protective tube 2 or composed of metal and arranged in a protective tube which itself consists of insulating material. The grids 3 and 4 have preferably different potentials so that they establish between them an electric field, the lines of which are indicated at 6 and extend across the discharge path 5. As can be seen from the drawing, the field lines are deflected out of the direction of the main electrode 1 so that when extended, they cannot impinge thereon.

Figure 2:
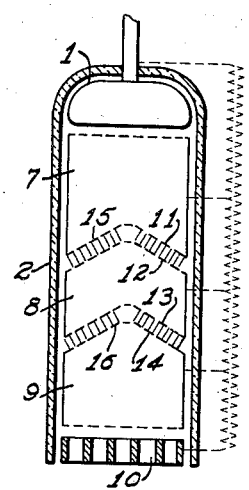

In the modification according to Fig. 2, Faraday cages 7, 8 and 9, as well as the grid 10, are arranged in the anode arms or the anode tube 2 in front of the anode 1. The grid bodies 7, 8, 9 and 10 have different potentials. At the end of the Faraday cage 7, there is a conical grid body 11 which is near the corresponding conical grid body 12 of the cage 8. In corresponding manner, the cages 8 and 9 have conical end grids 13 and 14. In the intermediate spaces between the grids 11, 12 and 13, 14, the field lines take the course indicated at 15 and 16, that is, the field lines are also in this case deflected from the direction towards the main electrode so that when extended, they do not impinge on the main electrode. The charge carriers following these field lines are therefore kept away from the anode 1 and guided to the coating surface of the cages 7 and 8. As can be seen from the drawing, the conical grid bodies face, with their apices, that electrode from which the charge carriers are to be kept during the blocking intervals.

Figure 3:
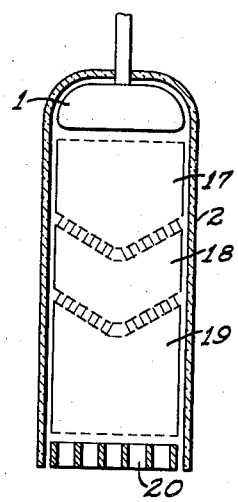

In the modification according to Fig. 3, the cages 17, 18 and 19 have conical grid surfaces, the apices of which face away from the anode. In this grid form, the condition is attained that the charge carriers coming from the anode 1 are also deflected away from the direction of the discharge path to the coating surfaces of the cages. In this way, the condition is attained that disturbing charge carriers are kept away with certainty from the control electrode 20.

Figure 4:
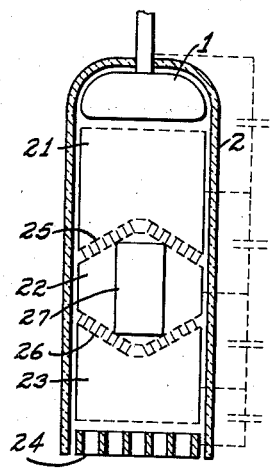
Figure 5:
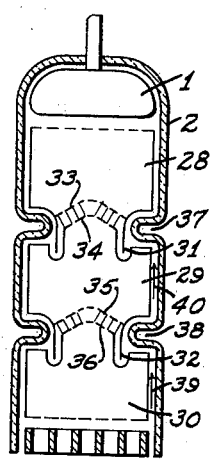

In the modification, according to Fig. 4, there are in the anode tube 2, cages 21, 22 and 23 as well as grid 24 in front of the anode 1. The cages 21, 22 and 23 have conical end surfaces constructed as grids which partly, as is shown in Fig. 2, are directed towards the anode and partly towards the grid 24. The course of the field lines is indicated at 25 and 26; in such a structure of the grid bodies provision is made that during the blocking intervals, the charge carriers impinge in neither one nor the other direction on one of the main electrodes. Within the cage 22, there is a recombination body 27 which is constructed as a cylinder and is fastened to the conical body of the cage 22. In the modification, according to Fig. 5, the cages 28 and 29, on the end sides on which conical grid bodies are arranged, cross walls 31 and 32 which penetrate loosely into corresponding grooves of the neighboring grid bodies of the cages 29 and 30.

As is seen from the drawing, a contact of the grid pairs 33, 34 on the one hand and 35, 36 on the other hand, is naturally to be avoided. The cross walls 31 and 32 have the purpose of catching the charge carriers falling in a radial direction and to prevent that these penetrate in the intermediate spaces between the cages and the anode protective tube. The anode tube 2 has ring-shaped projections 37 and 38 extending into intermediate spaces between the cages and the protective tube cross walls and prevent charge carriers from penetrating in the direction of the arrows 39 and 40 to the anode 1.

The construction disclosed in the drawing is most commonly associated with the familiar mercury pool cathode. The construction of the anode arms may be duplicated or multiplied for full wave or multiphase devices.

Many modifications are possible, such as changes in the shape, number and arrangements of the elements. Application of the invention may be made to various types of devices. No limitations are intended on the following claims except as is necessitated by the prior art.

I claim as my invention:

1. A gaseous discharge device comprising a plurality of main electrodes forming a discharge path therebetween, a plurality of bodies of different potentials located in the discharge path and having field lines between each two neighboring bodies extending at an acute angle other than ninety degrees to the discharge path whereby said discharge is directed away from said main electrodes.

2. A gaseous discharge device comprising a plurality of main electrodes forming a discharge path therebetween, at least two parallel grids in said discharge path and having surfaces which, throughout their area, lie at an acute angle other than ninety degrees to the discharge path.

3. A gaseous discharge device comprising a plurality of main electrodes forming a discharge path therebetwen, a plurality of conical grids in said discharge path, the apices of said conical grids being directed towards the electrode from which the charge carriers should be kept away during the blocking interval.

4. A device according to claim 1, characterized by the fact that the bodies form end portions of Faraday cages.

5. A device according to claim 1, characterized by the fact that the bodies form end portions of Faraday cages and projections from one body enter the space of a groove in an adjacent body.

ALFRED SIEMENS.